US012000386B2

(12) United States Patent
Wang et al.

(10) Patent No.: US 12,000,386 B2
(45) Date of Patent: Jun. 4, 2024

(54) PLUNGER, HYDRAULIC END AND PLUNGER PUMP

(71) Applicant: YANTAI JEREH PETROLEUM EQUIPMENT & TECHNOLOGIES CO., LTD., Shandong (CN)

(72) Inventors: Baojie Wang, Shandong (CN); Hailong Li, Shandong (CN); Haiping Cui, Shandong (CN); Xiaobin Li, Shandong (CN); Jixin Wang, Shandong (CN); Peng Li, Shandong (CN); Chen Jiang, Shandong (CN); Shulin Zhang, Shandong (CN); Wenping Cui, Shandong (CN); Anpeng Ge, Shandong (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 220 days.

(21) Appl. No.: 17/364,237

(22) Filed: Jun. 30, 2021

(65) Prior Publication Data
US 2022/0316461 A1    Oct. 6, 2022

(30) Foreign Application Priority Data
Mar. 31, 2021 (CN) .......................... 202110347506.X

(51) Int. Cl.
*F04B 1/0408* (2020.01)
*F04B 1/0452* (2020.01)
(Continued)

(52) U.S. Cl.
CPC .......... *F04B 1/0538* (2013.01); *F04B 1/0408* (2013.01); *F04B 1/0452* (2013.01);
(Continued)

(58) Field of Classification Search
CPC .... F04B 1/0538; F04B 1/0408; F04B 1/0452; F04B 53/1027; F04B 53/1032;
(Continued)

(56) References Cited

U.S. PATENT DOCUMENTS 1,963,684 A * 6/1934 Shimer ............... F16K 47/0112
137/329.04
4,886,085 A * 12/1989 Miller ..................... F16K 51/02
137/526
(Continued)

FOREIGN PATENT DOCUMENTS

CN         2059459 U    7/1990
CN         2267339 Y    11/1997
(Continued)

*Primary Examiner* — Charles G Freay
(74) *Attorney, Agent, or Firm* — XSENSUS LLP

(57) ABSTRACT

A plunger, a hydraulic end and a plunger pump are disclosed. The plunger includes a plunger body, the plunger body includes a flow channel; a first liquid inlet hole is located in the plunger body and passes through the sidewall of the plunger body; the plunger body includes a first end portion and a second end portion, a flow channel extends from the first end portion to the second end portion, a part of the flow channel close to the first end portion is closed, the flow channel extends to the second end portion and forms a first opening, the first liquid inlet hole is communicated with the flow channel, the first valve assembly is located at the first opening, and is configured to allow fluid to flow out from the flow channel at the first opening and prevent fluid from flowing back to the flow channel from outside.

12 Claims, 6 Drawing Sheets

(51) Int. Cl.
  *F04B 1/0538* (2020.01)
  *F04B 53/10* (2006.01)
  *F04B 53/12* (2006.01)
  *F04B 53/14* (2006.01)
  *F04B 53/18* (2006.01)
  *F16K 15/06* (2006.01)
  *F01M 11/00* (2006.01)
  *F04B 1/0461* (2020.01)

(52) U.S. Cl.
  CPC ...... *F04B 53/1027* (2013.01); *F04B 53/1032* (2013.01); *F04B 53/127* (2013.01); *F04B 53/14* (2013.01); *F04B 53/18* (2013.01); *F16K 15/067* (2021.08); *F01M 2011/0033* (2013.01); *F04B 1/0461* (2013.01)

(58) Field of Classification Search
  CPC ........ F04B 53/127; F04B 53/14; F04B 53/18; F16K 15/067; F16N 11/10; F16N 31/02
  USPC .......................................... 417/269, 273, 470
  See application file for complete search history.

(56) References Cited

U.S. PATENT DOCUMENTS

| | | | |
|---|---|---|---|
| 7,281,519 B2 * | 10/2007 | Schroeder | F04B 53/22 123/445 |
| 10,184,470 B2 | 1/2019 | Barnett, Jr. | |
| 2009/0158924 A1 * | 6/2009 | Schepp | F04B 1/0456 92/165 R |
| 2014/0127036 A1 | 5/2014 | Buckley et al. | |
| 2016/0160847 A1 * | 6/2016 | Choi | F04B 1/0408 417/487 |
| 2020/0347706 A1 * | 11/2020 | Nowell | F04B 1/00 |

FOREIGN PATENT DOCUMENTS

| | | |
|---|---|---|
| CN | 104179676 A | 12/2014 |
| CN | 204572378 U | 8/2015 |
| CN | 105952633 A | 9/2016 |
| CN | 111425379 A | 7/2020 |
| CN | 215174048 U * | 12/2021 |

* cited by examiner

PLUNGER, HYDRAULIC END AND PLUNGER PUMP

The present application claims the priority of Chinese patent application No. 202110347506.X filed on Mar. 31, 2021, for all purposes, the disclosure of which is incorporated herein by reference in its entirety as part of the present application.

TECHNICAL FIELD

Embodiments of the present disclosure relate to a plunger, a hydraulic end and a plunger pump.

BACKGROUND

In the field of oil and gas exploitation, fracturing technology is a method to make oil and gas reservoirs crack by using high pressure fracturing fluid. Fracturing technology can improve the flowing environment of oil and gas underground by causing cracks in oil and gas reservoirs, which can increase the output of oil wells, therefore, it is widely used in conventional and unconventional oil and gas exploitation, offshore and onshore oil and gas resources development.

A plunger pump is a device that uses the reciprocating motion of the plunger in the cylinder to pressurize liquid. The plunger pump has the advantages of high rated pressure, compact structure and high efficiency, so it is used in fracturing technology.

SUMMARY

Embodiments of the present disclosure provide a plunger, a hydraulic end and a plunger pump. The plunger can allow fluid to flow into the flow channel inside the plunger body from the first liquid inlet hole and flow out through the first valve assembly at the first opening, the valve box of the hydraulic end will not generate an intersecting line in the alternating chamber, thereby reducing the risk of cracking and water leakage of the valve box. Therefore, the plunger pump including the plunger and the hydraulic end can provide a linear plunger pump, which can improve the durability and service life of the plunger pump, reduce the maintenance cost and improve the maintenance efficiency of the plunger pump.

At least one embodiment of the present disclosure provides a plunger, which includes a plunger body, including a flow channel inside the plunger body; a first liquid inlet hole, located in the plunger body and passing through a sidewall of the plunger body; and a first valve assembly, wherein the plunger body includes a first end portion and a second end portion, the flow channel extends from the first end portion to the second end portion, a part of the flow channel close to the first end portion is closed, the flow channel extends to the second end portion and forms a first opening at the second end portion, the first liquid inlet hole is communicated with the flow channel, the first valve assembly is at the first opening, and is configured to allow fluid to flow out from the flow channel at the first opening and prevent fluid from flowing back to the flow channel from outside.

For example, in the plunger provided by an embodiment of the present disclosure, an axis of the plunger body passes through the first opening.

For example, in the plunger provided by an embodiment of the present disclosure, the first valve assembly includes: a first spring seat detachably connected to the second end portion and including a first spring; a first valve seat at the first opening and including a first intermediate hole; and a first valve body, wherein one end of the first valve body is arranged in contact with the first spring seat, and the other end of the first valve body is arranged in contact with the first valve seat and at an inner side of the first intermediate hole.

For example, in the plunger provided by an embodiment of the present disclosure, the first valve body includes a first main body portion, and a first guide rod and a second guide rod which are respectively arranged on two sides of the first main body portion, the first spring seat includes a first seat fixing portion, a first spring fixing portion and a first guide portion in the first spring fixing portion, the first seat fixing portion is detachably connected to the second end portion, and the first spring is sleeved outside the first spring fixing portion; the first spring is arranged in contact with the first main body portion, and the first guide portion is configured to accommodate at least a part of the first guide rod to guide the first guide rod.

For example, in the plunger provided by an embodiment of the present disclosure, the first valve assembly further includes: a first guide seat arranged at the first opening and located at a side of the first valve seat away from the first spring seat; and a second guide portion connected to the first guide seat and configured to accommodate at least a part of the second guide rod to guide the second guide rod.

For example, in the plunger provided by an embodiment of the present disclosure, the first valve assembly further includes: a first sealing element located outside the first body portion and configured to be in close contact with the first valve seat.

For example, in the plunger provided by an embodiment of the present disclosure, the plunger body is a rotary body, the first liquid inlet hole is arranged in a plurality, and the plurality of first liquid inlet holes are arranged at intervals along a circumferential direction of the plunger body.

At least one embodiment of the present disclosure further provides an hydraulic end of a plunger pump, which includes: a valve box, including a third end portion and a fourth end portion, wherein the valve box includes a plunger chamber inside the valve box, the plunger chamber includes a low pressure chamber, an alternating chamber and a high pressure chamber which are sequentially arranged, the low pressure chamber includes a second opening at a position where the third end portion is located, the alternating chamber is communicated with the low pressure chamber, the high pressure chamber is communicated with the alternating chamber and located at a side of the alternating chamber away from the low pressure chamber, and the high pressure chamber includes a third opening at a position where the fourth end portion is located; the valve box further includes a second liquid inlet hole and a liquid outlet hole, the second liquid inlet hole passes through a sidewall of the valve box and is communicated with the low pressure chamber, the liquid outlet hole passes through a sidewall of the valve box and is communicated with the high pressure chamber; wherein the low pressure chamber, the alternating chamber and the high pressure chamber are sequentially arranged in a first direction.

For example, in the hydraulic end provided by an embodiment of the present disclosure, an average size of the low pressure chamber in a direction perpendicular to the first direction is greater than an average size of the alternating chamber in the direction perpendicular to the first direction, and an average size of the high pressure chamber in the direction perpendicular to the first direction is greater than an average size of the alternating chamber in the direction perpendicular to the first direction.

For example, in the hydraulic end provided by an embodiment of the present disclosure, the low pressure chamber, the alternating chamber and the high pressure chamber are coaxially arranged.

For example, the hydraulic end provided by an embodiment of the present disclosure further includes a first nut fixed at the second opening and including a second intermediate hole; and a plunger extending into the plunger chamber from the second intermediate hole and configured to reciprocate in the first direction, wherein the plunger includes a plunger body, the plunger body includes a flow channel inside the plunger body; a first liquid inlet hole on the plunger body and passing through a sidewall of the plunger body; and a first valve assembly, the plunger body includes a first end portion and a second end portion, the flow channel extends from the first end portion to the second end portion, a part of the flow channel close to the first end portion is closed, a part of the flow channel close to the second end portion includes a first opening, the first liquid inlet hole is communicated with the flow channel, and the first valve assembly is at the first opening, and is configured to allow fluid to flow out from the flow channel at the second end portion and prevent fluid from flowing back to the flow channel from outside, the first liquid inlet hole is always in the low pressure chamber during the movement of the plunger.

For example, the hydraulic end provided by an embodiment of the present disclosure further includes a second nut fixed at the third opening; and a second valve assembly in the high pressure chamber, wherein the second valve assembly is configured to allow fluid to flow from the alternating chamber into the high pressure chamber and prevent fluid from flowing back from the high pressure chamber to the alternating chamber.

For example, in the hydraulic end provided by an embodiment of the present disclosure, the second valve assembly includes: a second spring seat arranged in contact with and pressed by the second nut and including a second spring; a second valve seat at a part of the high pressure chamber close to the alternating chamber and including a third intermediate hole; and a second valve body, wherein one end of the second valve body is arranged in contact with the second spring seat, and the other end of the second valve body is arranged in contact with the second valve seat and at an inner side of the third intermediate hole.

For example, in the hydraulic end provided by an embodiment of the present disclosure, the second valve body includes a second main body portion, and a third guide rod and a fourth guide rod which are respectively arranged on two sides of the second main body portion, the second spring seat includes a second seat fixing portion, a second spring fixing portion and a third guiding portion in the second spring fixing portion, the second seat fixing portion is pressed against the third opening by the second nut, the second spring is sleeved outside the second spring fixing portion; the second spring is arranged in contact with the second main body portion, and the third guide portion is configured to accommodate at least a part of the third guide rod to guide the third guide rod.

For example, in the hydraulic end provided by an embodiment of the present disclosure, the second valve assembly further includes: a second guide seat at a side of the second valve seat away from the second spring seat; and a fourth guide portion connected to the second guide seat and configured to accommodate at least a part of the fourth guide rod to guide the fourth guide rod.

For example, in the hydraulic end provided by an embodiment of the present disclosure, the second valve assembly further includes: a second sealing element located outside the second body portion and configured to be in close contact with the second valve seat.

For example, the hydraulic end provided by an embodiment of the present disclosure further includes a support ring located in the low pressure chamber and at a side of the first nut close to the alternating chamber, wherein the support ring includes a first annular portion and a second annular portion which are relatively arranged at intervals, and a plurality of support strips which are between the first annular portion and the second annular portion, one end of each of the plurality of support strips is fixed with the first annular portion and the other end is fixed with the second annular portion, the plurality of support strips are arranged at intervals to form a plurality of hollow openings, the first annular portion includes a fourth intermediate hole, the second annular portion includes a fifth intermediate hole, the plunger is configured to pass through the fourth intermediate hole and the fifth intermediate hole, and the first nut is configured to press the support ring.

For example, in the hydraulic end provided by an embodiment of the present disclosure, the valve box further includes a first grease injection hole, the first grease injection hole passes through a sidewall of the valve box and is communicated with the low pressure chamber, and the second annular portion includes a second grease injection hole, the second grease injection hole extends from an outer sidewall of the second annular portion to an inner sidewall of the second annular portion.

For example, in the hydraulic end provided by an embodiment of the present disclosure, the support ring further includes: a first sealing groove on an outer sidewall of the first annular portion; and a second sealing groove on an outer sidewall of the second annular portion, wherein the first sealing groove and the second sealing groove are configured to accommodate a sealing ring.

For example, in the hydraulic end provided by an embodiment of the present disclosure, the valve box is arranged in a plurality, and the plurality of valve boxes are arranged in a second direction perpendicular to the first direction.

For example, in the hydraulic end provided by an embodiment of the present disclosure, the plurality of valve boxes are integrally formed, or two adjacent ones of the plurality of valve boxes are connected by a connection element.

At least one embodiment of the present disclosure further provides a plunger pump, which includes a power end; and any one of the abovementioned hydraulic end.

For example, in the plunger pump provided by an embodiment of the present disclosure, two sides of the power end in the first direction are respectively provided with one hydraulic end.

For example, in the plunger pump provided by an embodiment of the present disclosure, the power end includes a linear motor.

For example, the plunger pump provided by an embodiment of the present disclosure further includes an oil receiving plate located below the hydraulic end and including a bottom plate and a shell arranged around the bottom plate, the bottom plate and the shell forming an oil receiving groove together, and the oil receiving groove being configured to receive liquid dripped from the hydraulic end; an oil receiving box located at a side of the bottom plate away from the hydraulic end and configured to collect liquid in the oil receiving groove; a scraper located in the oil receiving groove and configured to move in a length direction of the bottom plate; and a driving assembly configured to drive the scraper to move in the length direction of the bottom plate.

BRIEF DESCRIPTION OF THE DRAWINGS

In order to more clearly illustrate the technical solutions of the embodiments of the disclosure, the drawings of the embodiments will be briefly described in the following; it is obvious that the described drawings below are only related to some embodiments of the disclosure and thus are not limitative to the disclosure.

DETAILED DESCRIPTION

In order to make objectives, technical details and advantages of the embodiments of the present disclosure more clearly, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "include," "including," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

Generally, the plunger pump includes a power end and a hydraulic end, the power end includes a crank-connecting rod mechanism, and the hydraulic end includes a valve box and a plunger, the power end can convert mechanical energy of the prime mover into the reciprocating motion of the plunger of the hydraulic end through the transmission mechanism and crank-connecting rod mechanism (for example, crankshaft, connecting rod and crosshead), and the hydraulic end converts the low pressure liquid into the high pressure liquid through the reciprocating motion of the plunger.

Figure 1:
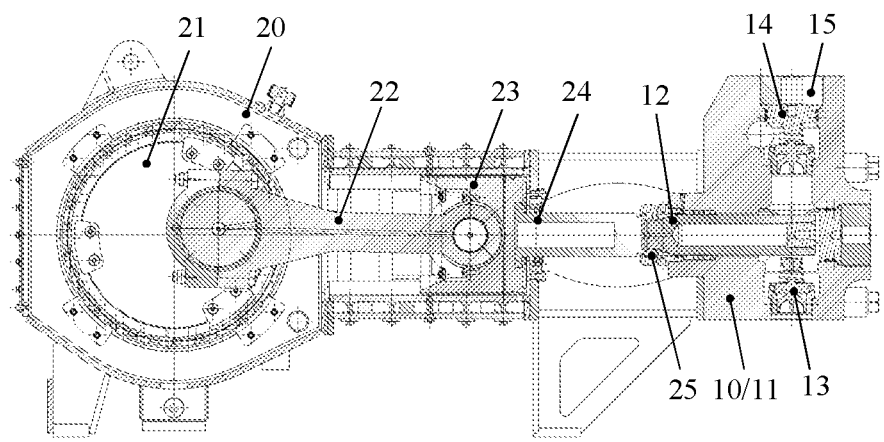
FIG. 1 is a sectional view of a plunger pump.
Figure 2:
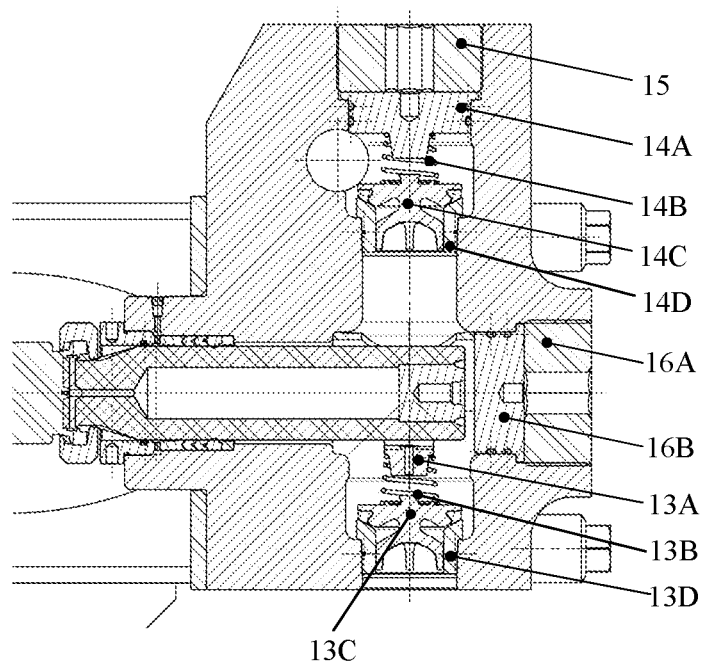
FIG. 2 is a schematic diagram of a hydraulic end of a plunger pump illustrated in FIG. 1.
Figure 3:
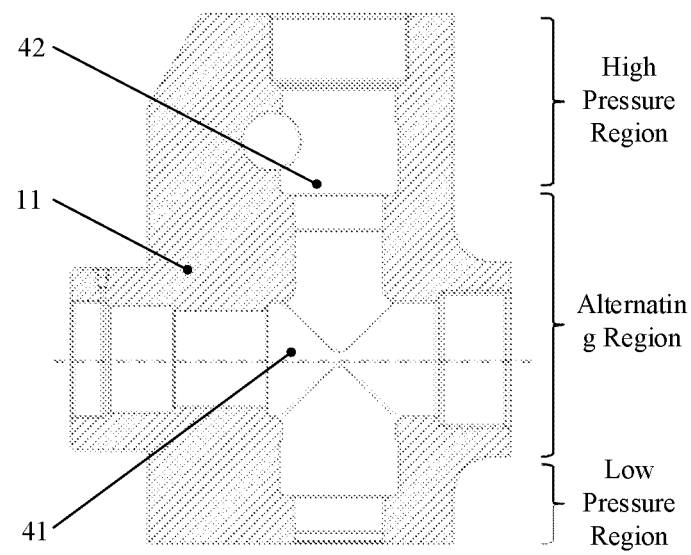
FIG. 3 is a schematic diagram of a valve box in a hydraulic end illustrated in FIG. 2.

FIG. 1 is a sectional view of a plunger pump; FIG. 2 is a schematic diagram of the hydraulic end of the plunger pump illustrated in FIG. 1; FIG. 3 is a schematic diagram of a valve box in the hydraulic end illustrated in FIG. 2. As illustrated in FIG. 1, the plunger pump 40 includes a power end 20 and a hydraulic end 10. As illustrated in FIGS. 1 and 2, the hydraulic end 10 mainly includes a valve box 11, a plunger 12, a first valve assembly 13, a second valve assembly 14 and a pressing nut 15. The first valve assembly 13 is a check valve, which allows fluid to enter the valve box 11 from outside but prevents it from flowing out, the second valve assembly 14 is also a check valve, which allows fluid in the valve box 11 to flow out but prevents it from entering the valve box 11 from outside. The power end 20 mainly includes a crankshaft 21, a connecting rod 22, a crosshead 23, a tie rod 24 and a clamp 25. The crankshaft 21 is connected to the connecting rod 22, the crosshead 23 is connected to the connecting rod 22 and the tie rod 24 respectively, and the tie rod 24 is connected to the plunger 12 through the clamp.

The working principle of the plunger pump is provided as follows: driven by the prime mover, the crankshaft 21 of the power end 20 rotates to drive the connecting rod 22 and crosshead 23 to reciprocate; then the crosshead 23 drives the plunger 12 to reciprocate through the tie rod 24. When the plunger 12 moves back (for example, toward the crankshaft 21), the volume inside the valve box 11 gradually increases to form local subatmospheric pressure or vacuum, at this time, the first valve assembly 13 is opened, the second valve assembly 14 is closed, and external fluid enters the valve box 11; when the plunger 12 returns to the limit position, the inside of the valve box 11 is filled with fluid, and a fluid suction process is completed. After that, when the plunger 12 moves forward, the volume inside the valve box 11 gradually decreases, and the fluid inside the valve box 11 is pressed and the pressure increases, at this time, the first valve assembly 13 is closed and the second valve assembly 14 is opened, and the fluid inside the valve box 11 is discharged through the second valve assembly 14. When the plunger 12 moves to the limit position, the volume inside the valve box 11 is the smallest, and a fluid discharge process is completed. Therefore, under the reciprocating motion of the plunger 12, the above-mentioned fluid suction process and the above-mentioned fluid discharge process are continuously alternated, so that the low pressure fluid can be continuously converted into high pressure fluid and output.

However, as illustrated in FIG. 2, the first valve assembly 13 includes a first spring seat 13A, a first spring 13B, a first valve seat 13D and a first valve body 13C located between the first spring seat 13A and the first valve seat 13D. The second valve assembly 14 includes a second spring seat 14A, a second spring 14B, a second valve seat 14D and a second valve body 14C located between the second spring seat 14A and the second valve seat 14D. In the process of opening and closing the first valve assembly 13 and the second valve assembly 14, the first valve body 13C and the second valve body 14C may deflect.

In addition, as illustrated in FIG. 3, the inside of the valve box 11 has a cross intersecting structure, that is, the inside of the valve box 11 includes a first chamber 41 and a second chamber 42, the first chamber 41 and the second chamber 42 cross each other; the first chamber 41 is used for accommodating the plunger 12, and the second chamber 42 can be divided into a low pressure region, an alternating region and a high pressure region according to the pressure load. However, the intersecting line between the first chamber 41 and the second chamber 42 is just in the alternating region. According to the mechanical analysis, the stress concentration at the intersecting line of the first chamber 41 and the second chamber 42 is obvious, coupled with the action of alternating load, fatigue cracks easily occur at the intersecting line, thereby leading to cracking and water leakage of the valve box 11. Therefore, the plunger pump needs to change the valve box frequently, which leads to the increase of cost and the decrease of efficiency.

With this regard, embodiments of the present disclosure provide a plunger, a hydraulic end and a plunger pump. The plunger includes a plunger body, a first liquid inlet hole and a first valve assembly; the plunger body includes a flow channel located inside the plunger body; the first liquid inlet hole is located in the plunger body and passes through the sidewall of the plunger body; the plunger body includes a first end portion and a second end portion, the flow channel inside the plunger body extends from the first end portion to the second end portion, a part of the flow channel close to the first end portion is closed, the flow channel inside the plunger body extends to the second end portion and forms a first opening at the second end portion, the first liquid inlet hole is communicated with the flow channel, the first valve assembly is located at the first opening, and is configured to allow fluid to flow out from the flow channel at the first opening and prevent fluid from flowing back to the flow channel from outside. Therefore, the plunger can allow fluid to flow into the flow channel inside the plunger body from the first liquid inlet hole and flow out through the first valve assembly at the first opening, so that it can be used in a linear plunger pump, thereby improving the durability of the linear plunger pump and reducing the cost of the linear plunger pump.

Hereinafter, the plunger, hydraulic end and plunger pump provided by the embodiments of the present disclosure will be described in detail with reference to the accompanying drawings.

Figure 4:
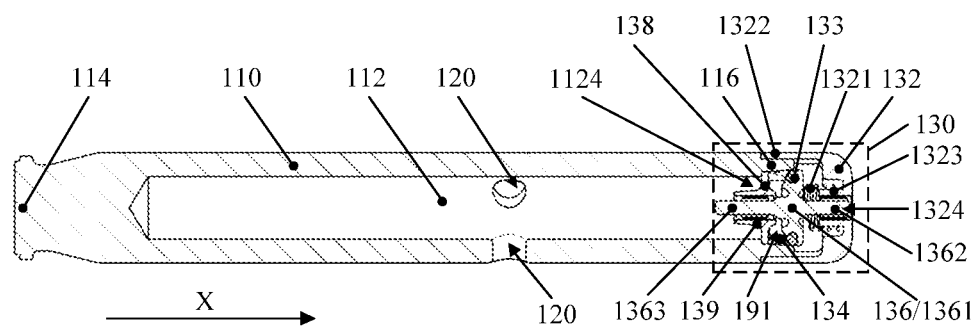
FIG. 4 is a schematic structural diagram of a plunger according to an embodiment of the present disclosure.

FIG. 4 is a schematic structural diagram of a plunger according to an embodiment of the present disclosure. As illustrated in FIG. 4, the plunger 100 includes a plunger body 110, a first liquid inlet hole 120 and a first valve assembly 130; the plunger body 110 includes a flow channel 112 located inside the plunger body 110; the first liquid inlet hole 120 is located in the plunger body 110 and passes through the sidewall of the plunger body 110. The plunger body 110 includes a first end portion 114 and a second end portion 116, the flow channel 112 inside the plunger body 110 extends from the first end portion 114 to the second end portion 116 of the plunger body 110, a part of the flow channel 112 close to the first end portion 114 is closed, the flow channel 112 inside the plunger body 110 extends to the second end portion 116 and forms a first opening 1124 at the second end portion 116. That is, the plunger body 110 has a hollow structure from the second end portion 116 to the first end portion 114, that is, the above-mentioned flow channel 112.

As illustrated in FIG. 4, the first liquid inlet hole 120 passes through the sidewall of the plunger body 110 and is communicated with the flow channel 112; the first valve assembly 130 is located at the first opening 1124, and is configured to allow fluid to flow out from the flow channel 112 at the first opening 1124 and prevent fluid from flowing back to the flow channel 112 from outside.

In the plunger provided by the embodiment of the present disclosure, because the first valve assembly is configured to allow fluid to flow out from the flow channel at the first opening and prevent fluid from flowing back to the flow channel from outside, the plunger can allow fluid to flow into the flow channel inside the plunger body from the first liquid inlet hole and flow out through the first valve assembly at the first opening. The plunger can be used in a linear plunger pump, thereby improving the durability of the linear plunger pump and reducing the cost of the linear plunger pump.

In some examples, as illustrated in FIG. 4, the axis of the plunger body 110 passes through the first opening 1124; that is, the direction from the first end portion 114 to the second end portion 116 passes through the first opening 1124.

In some examples, as illustrated in FIG. 4, the first valve assembly 130 includes a first spring seat 132, a first valve seat 134 and a first valve body 136; the first valve body 136 is located between the first spring seat 132 and the first valve seat 134.

As illustrated in FIG. 4, the first spring seat 132 is detachably connected to the second end portion 116 and includes a first spring 1321; the first valve seat 134 is located at the first opening 1124 and includes a first intermediate hole 191; one end of the first valve body 136 is arranged in contact with the first spring seat 132, and the other end of the first valve body 136 is arranged in contact with the first valve seat 134 and located inside the first intermediate hole 191. When the first valve body 136 moves toward the first valve seat 134 and comes into close contact with the first valve seat 134, the first valve seat 134 and the first valve body 136 can seal the first opening 1124 together; when the first valve body 136 moves toward the first spring seat 132 and separates from the first valve seat 134, the fluid can flow out from the flow channel 112 through the first valve assembly 130.

For example, the first spring seat 132 can be detachably connected to the second end portion 116 by means of threaded connection, thereby facilitating the replacement of the first valve assembly. Of course, the embodiments of the present disclosure include but are not limited thereto, and the first spring seat can also be detachably connected to the second end portion by other connecting modes.

In some examples, as illustrated in FIG. 4, the first valve body 136 includes a first main body portion 1361, and a first guide rod 1362 and a second guide rod 1363 respectively arranged on the two sides of the first main body portion 1361; the first spring seat 132 includes a first seat fixing portion 1322, a first spring fixing portion 1323 and a first guide portion 1324 located in the first spring fixing portion 1323; the first seat fixing portion 1322 is detachably connected to the second end portion 116, and the first spring 1321 is sleeved outside the first spring fixing portion 1323.

As illustrated in FIG. 4, the first spring 1321 is arranged in contact with the first body portion 1361. Under the elastic force of the first spring 1321, the first valve body 136 is in close contact with the first valve seat 135, the first guide portion 1324 is configured to accommodate at least a part of the first guide rod 1362, so that the first guide rod 1362 can be guided. Therefore, in the working process of the first valve assembly, because the first guide portion can guide the first guide rod, the first valve body can stably move in the extending direction of the first guide rod, thereby avoiding the first valve assembly from deflecting when opening and closing.

In some examples, as illustrated in FIG. 4, the first valve assembly 130 further includes a first guide seat 138 and a second guide portion 139. The first guide seat 138 is arranged at the first opening 1124 and located at a side of the first valve seat 134 away from the first spring seat 132; the second guide portion 139 is connected to the first guide seat 139 and configured to accommodate at least a part of the second guide rod 1363 to guide the second guide rod 1363. Therefore, in the working process of the first valve assembly, because the first guide portion can guide the first guide rod and the second guide portion can guide the second guide rod, the first valve body can stably move in the extending direction of the first guide rod and the second guide rod, thereby further avoiding the first valve assembly from deflecting when opening and closing.

For example, the first guide rod 1362 and the second guide rod 1363 are coaxially arranged, that is, the axis of the first guide rod 1362 and the axis of the second guide rod 1363 coincide with each other.

In some examples, as illustrated in FIG. 4, the first valve assembly 130 further includes a first sealing element 133, the first sealing element 133 is located outside the first body portion 1361 and is configured to be in close contact with the first valve seat 134, so that the sealing performance between the first valve seat and the first valve body can be improved.

In some examples, as illustrated in FIG. 4, the plunger body 110 can be a rotary body, and the first liquid inlet holes 120 are provided in a plurality; the plurality of first liquid inlet holes 120 are arranged at intervals along the circumferential direction of the plunger body 110, so that the liquid inlet efficiency can be improved.

In some examples, as illustrated in FIG. 4, the first spring seat 132 includes a plurality of hollow structures, so as to facilitate the fluid to flow out from the first spring seat 132.

In some examples, as illustrated in FIG. 4, the contact surface between the first opening 1124 and the first valve seat 135 can be a conical surface, which matches the conical surface of the first valve seat 135, so that the first valve seat can be more conveniently fixed and detached.

Figure 5:
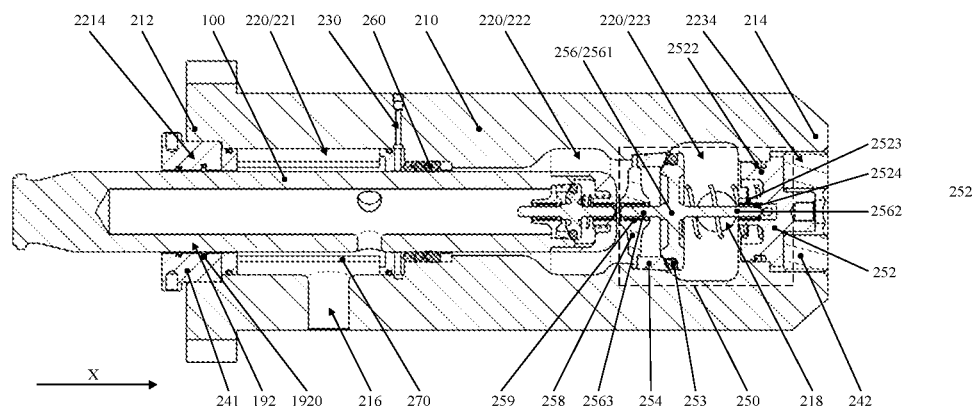
FIG. 5 is a schematic structural diagram of a hydraulic end according to an embodiment of the present disclosure.
Figure 6:
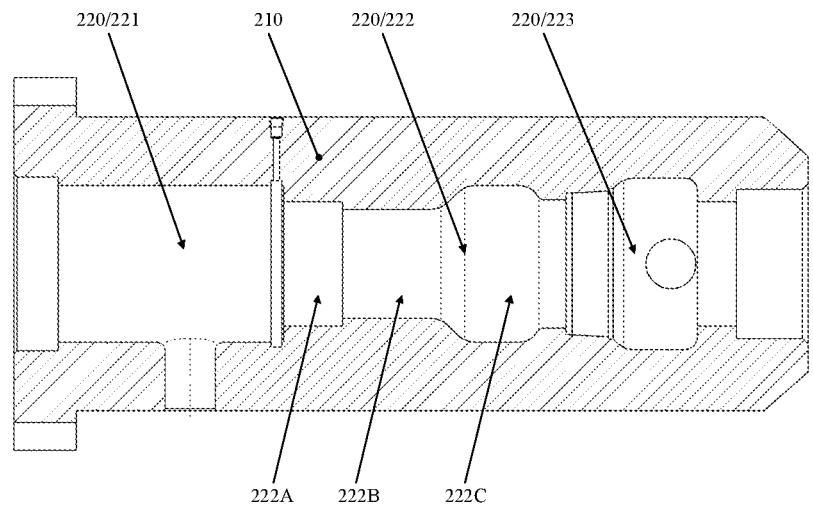
FIG. 6 is a structural schematic diagram of a valve box in a hydraulic end according to an embodiment of the present disclosure.

An embodiment of the present disclosure further provides a hydraulic end of the plunger pump. FIG. 5 is a schematic structural diagram of a hydraulic end according to an embodiment of the present disclosure; FIG. 6 is a structural schematic diagram of a valve box in a hydraulic end according to an embodiment of the present disclosure.

As illustrated in FIGS. 5 and 6, the hydraulic end 200 includes a valve box 210; the valve box 210 includes a third end portion 213 and a fourth end portion 214; the valve box 210 includes a plunger chamber 220 located inside the valve box 210; the plunger chamber 220 includes a low pressure chamber 221, an alternating chamber 222 and a high pressure chamber 223 which are sequentially arranged; the low pressure chamber 221 includes a second opening 2214 at a position where the third end portion 213 is located, the alternating chamber 222 is communicated with the low pressure chamber 221, the high pressure chamber 223 is communicated with the alternating chamber 222 and is located at the side of the alternating chamber 222 away from the low pressure chamber 221, and the high pressure chamber 223 includes a third opening 2234 at a position where the fourth end portion 214 is located. It can be seen that the plunger chamber 220 penetrates through the valve box 210, and has a second opening 2214 at the second end portion 212 and a third opening 2234 at the third end portion 214.

As illustrated in FIGS. 5 and 6, the valve box 210 further includes a second liquid inlet hole 216 and a liquid outlet hole 218, the second liquid inlet hole 212 passes through the sidewall of the valve box 210 and is communicated with the low pressure chamber 221, and the liquid outlet hole 218 passes through the sidewall of the valve box 210 and is communicated with the high pressure chamber 223; the low pressure chamber 221, the alternating chamber 222, and the high pressure chamber 223 are sequentially arranged in the first direction X.

In the hydraulic end provided by the embodiment of the present disclosure, when the plunger is arranged in the plunger chamber, the fluid can enter the low pressure chamber and the alternating chamber from the second liquid inlet hole, and then be pressurized under the reciprocating motion of the plunger and flow out from the liquid outlet hole. Because the low pressure chamber, the alternating chamber and the high pressure chamber are sequentially arranged in the first direction X and are used for accommodating the plunger at the same time, the valve box will not generate an intersecting line in the alternating chamber, thereby reducing the risk of cracking and water leakage of the valve box and improving the durability and service life of the valve box. Therefore, the hydraulic end can improve the durability and service life of the plunger pump, reduce the maintenance cost and improve the maintenance efficiency of the plunger pump.

In some examples, as illustrated in FIG. 6, the average size of the low pressure chamber 221 in a direction perpendicular to the first direction X is greater than the average size of the alternating chamber 222 in the direction perpendicular to the first direction X, and the average size of the high pressure chamber 223 in the direction perpendicular to the first direction X is greater than the average size of the alternating chamber 222 in the direction perpendicular to the first direction X. That is, the average radial dimension of the low pressure chamber 221 is greater than the average radial dimension of the alternating chamber 222, and the average radial dimension of the high pressure chamber 223 is greater than the average radial dimension of the alternating chamber 222.

In some examples, as illustrated in FIG. 6, the low pressure chamber 221, the alternating chamber 222 and the high pressure chamber 223 are coaxially arranged. Therefore, the plunger chamber in the valve box is convenient to manufacture and is beneficial to avoiding stress concentration.

In some examples, as illustrated in FIG. 5, the hydraulic end 200 further includes a first nut 241 and a plunger 100; the first nut 241 is fixed at the second opening 2214 and includes a second intermediate hole 192; the plunger 100 extends into the plunger chamber 220 from the second intermediate hole 192 and is configured to reciprocate in the first direction X.

For example, as illustrated in FIG. 5, the inner side of the second intermediate hole 192 of the first nut 241 can be provided with a sealing groove 1920 for placing a sealing ring, so as to play a sealing role. It should be noted that in the first direction X, one sealing groove or a plurality of sealing grooves can be provided.

As illustrated in FIG. 5, the plunger 100 can be the plunger 100 provided by any of the above examples. For example, the plunger 100 includes a plunger body 110, a first liquid inlet hole 120 and a first valve assembly 130; the plunger body 110 includes a flow channel 112 located inside the plunger body 110; the first liquid inlet hole 120 is located in the plunger body 110 and passes through the sidewall of the plunger body 110. The plunger body 110 includes a first end portion 114 and a second end portion 116, the flow channel 112 inside the plunger body 110 extends from the first end portion 114 to the second end portion 116 of the plunger body 110, the part of the flow channel 112 close to the first end portion 114 is closed, the flow channel 112 inside the plunger body 110 extends to the second end portion 116 and forms a first opening 1124 at the second end portion 116. The first liquid inlet hole 120 passes through the sidewall of the plunger body 110 and is communicated with the flow channel 112, the first valve assembly 130 is located at the first opening 1124 and is configured to allow fluid to flow out from the flow channel 112 at the first opening 1124 and prevent fluid from flowing back to the flow channel 112 from outside. It should be noted that in order to clearly illustrate the reference numbers of other components in the hydraulic end, the reference numbers of various components in the plunger are omitted in FIG. 5, and the reference numbers of various components in the plunger can be seen in FIG. 4.

In some examples, as illustrated in FIG. 5, the hydraulic end 200 further includes a second nut 242 and a second valve assembly 250; the second nut 242 is fixed at the third opening 2234, and the second valve assembly 250 is located in the high pressure chamber 223, the second valve assembly 250 is configured to allow fluid to flow into the high pressure chamber 223 from the alternating chamber 222 and prevent fluid from flowing back from the high pressure chamber 223 to the alternating chamber 222.

In the hydraulic end provided by this example, when the plunger moves back (the plunger moves in the direction from the high pressure chamber to the low pressure chamber), the volume inside the valve box gradually increases to form partial vacuum or subatmospheric pressure, at this time, the first valve assembly is opened and the second valve assembly is closed, and fluid can enter the flow channel inside the plunger through the second inlet hole and the first liquid inlet hole, and enter the alternating chamber and the high pressure chamber from the first valve assembly; when the plunger returns to the limit position, the inside of the valve box is filled with fluid, and a fluid suction process is completed; when the plunger moves forward (the plunger moves in the direction from the low pressure chamber to the high pressure chamber), the volume inside the valve box gradually decreases, the fluid is pressed by the plunger, and the pressure increases, at this time, the second valve assembly is opened, the first valve assembly is closed, and the fluid flows out from the outlet hole communicated with the high pressure chamber; when the plunger moves to the limit position, the volume inside the valve box is the smallest, and a fluid discharge process is completed. Because the plunger can continuously reciprocate, the above-mentioned fluid suction process and fluid discharge process are continuously alternated, so high pressure fluid can be continuously discharged from the liquid outlet hole.

In some examples, as illustrated in FIG. 6, the radial dimensions of the low pressure chamber 221 at different positions in the first direction X are approximately the same. The alternating chamber 222 can be divided into a first sub-alternating chamber 222A, a second sub-alternating chamber 222B and a third sub-alternating chamber 222C according to different radial dimensions; the first sub-alternating chamber 222A can be used for accommodating the plunger 100 and a high pressure sealing assembly 260, and the high pressure sealing assembly 260 is respectively arranged in contact with the plunger 100 and the sidewall of the first sub-alternating chamber 222A; the radial dimension of the second sub-alternating chamber 222B is smaller than the radial dimension of the first sub-alternating chamber 222A and greater than the radial dimension of the plunger 100, so as to accommodate the plunger 100; the radial dimension of the third sub-alternating chamber 222C is greater than the radial dimension of the first sub-alternating chamber 222A, so that the accommodation space can be increased for accommodating fluid.

In some examples, as illustrated in FIG. 5, the second valve assembly 250 includes a second spring seat 252, a second valve seat 254 and a second valve body 256; the second valve body 256 is arranged between the second spring seat 252 and the second valve seat 254. The second spring seat 252 is arranged in contact with and pressed by the second nut 242, and includes a second spring 2521; the second valve seat 254 is located at a part of the high pressure chamber 223 close to the alternating chamber 222, and includes a third intermediate hole 193; one end of the second valve body 256 is arranged in contact with the second spring seat 252, and the other end of the second valve body 256 is arranged in contact with the second valve seat 254 and is located inside the third intermediate hole 193. Therefore, when the second valve body 256 moves toward the second valve seat 254 and comes into close contact with the second valve seat 254, the second valve seat 254 and the second valve body 256 can seal the part of the high pressure chamber close to the alternating chamber together; when the second valve body 256 moves toward the second spring seat 252 and separates from the second valve seat 254, the fluid can flow from the alternating chamber 222 into the high pressure chamber 223 through the second valve assembly 130.

In some examples, as illustrated in FIG. 5, the second valve body 256 includes a second body portion 2561, and a third guide rod 2562 and a fourth guide rod 2563 respectively arranged on the two sides of the second body portion 2561; the second spring seat 252 includes a second seat fixing portion 2522, a second spring fixing portion 2523 and a third guiding portion 2524 located in the second spring fixing portion 2523, the second seat fixing portion 2522 is pressed against the third opening 2234 by the second nut 242, the second spring 2521 is sleeved outside the second spring fixing portion 2523; the second spring 2521 is arranged in contact with the second body portion 2561, and the third guide portion 2524 is configured to accommodate at least a part of the third guide rod 2562 to guide the third guide rod 2562. Therefore, in the working process of the second valve assembly, because the third guide portion can guide the third guide rod, the second valve body can stably move in the extending direction of the third guide rod, thereby avoiding the second valve assembly from deflecting when opening and closing.

In some examples, as illustrated in FIG. 5, the second valve assembly 250 further includes a second guide seat 258 and a fourth guide portion 259, and the second guide seat 258 is located at the side of the second valve seat 254 away from the second spring seat 252; the fourth guide portion 259 is connected to the second guide seat 258 and configured to accommodate at least a part of the fourth guide rod 2563 to guide the fourth guide rod 2563. Therefore, in the working process of the second valve assembly, because the third guide portion can guide the third guide rod and the fourth guide portion can guide the fourth guide rod, the second valve body can stably move in the extending direction of the third guide rod and the fourth guide rod, thereby further avoiding the second valve assembly from deflecting when opening and closing.

In some examples, as illustrated in FIG. 5, the second valve assembly 250 further includes a second sealing element 253, the second sealing element 253 is located outside the second body portion 2561 and is configured to be in close contact with the second valve seat 254, so that the sealing performance between the second valve seat and the second valve body can be improved.

Figure 7A:
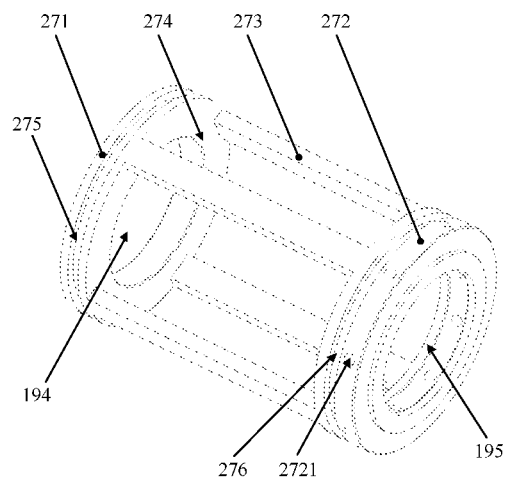
FIG. 7A is a structural schematic diagram of a support ring in a hydraulic end according to an embodiment of the present disclosure.
Figure 7B:
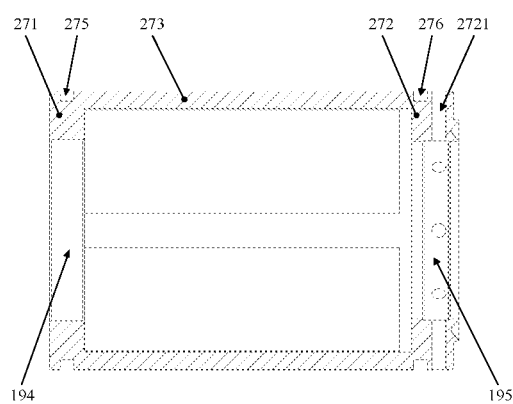
FIG. 7B is a schematic sectional view of a support ring in a hydraulic end according to an embodiment of the present disclosure.

FIG. 7A is a schematic structural diagram of a support ring in a hydraulic end according to an embodiment of the present disclosure; FIG. 7B is a schematic sectional view of a support ring in a hydraulic end according to an embodiment of the present disclosure. As illustrated in FIG. 5, FIG. 7A and FIG. 7B, the hydraulic end 200 further includes a support ring 270, the support ring 270 is located in the low pressure chamber 221 and at a side of the first nut 241 close to the alternating chamber 222.

As illustrated in FIG. 7A and FIG. 7B, the support ring 270 includes a first annular portion 271 and a second annular portion 272 which are relatively arranged at intervals, and a plurality of support strips 273 located between the first annular portion 271 and the second annular portion 272; one end of each support strip 273 is fixed with the second annular portion 272 and the other end is fixed with the second annular portion 272, and the plurality of support strips 273 are arranged at intervals to form a plurality of hollow openings 274; the first annular portion 271 includes a fourth intermediate hole 194, the second annular portion 272 includes a fifth intermediate hole 195, the plunger 100 is configured to pass through the fourth intermediate hole 194 and the fifth intermediate hole 195, and the first nut 241 is configured to press the support ring 270. Therefore, because the space of the low pressure chamber is large, the support ring 270 can support and restrict the plunger 100, thereby improving the stability of the hydraulic end.

In some examples, as illustrated in FIGS. 5, 7A and 7B, the valve box 210 further includes a first grease injection hole 230, the first grease injection hole 230 passes through the sidewall of the valve box 210 and is communicated with the low pressure chamber 221, and the second annular portion 272 includes a second grease injection hole 2721, the second grease injection hole 2721 extends from the outer sidewall of the second annular portion 272 to the inner sidewall of the second annular portion 272. Therefore, lubricating grease can be injected into the valve box 210 through the first grease injection hole 230, and lubricating grease can be supplied to the second annular portion and the plunger through the second grease injection hole.

In some examples, as illustrated in FIGS. 5, 7A and 7B, the support ring 270 further includes a first sealing groove 275 and a second sealing groove 276; the first sealing groove 275 is located on the outer sidewall of the first annular portion 271, the second sealing groove 276 is located on the outer sidewall of the second annular portion 272, and the first sealing groove 275 and the second sealing groove 276 are configured to accommodate a sealing ring. Therefore, the support ring can seal the part of the low pressure chamber located between the first sealing groove and the second sealing groove.

In some examples, as illustrated in FIG. 5, the limit length of reciprocating motion of the plunger 100 does not exceed the length of the support ring 270; in addition, the limit position of the first liquid inlet hole 120 of the plunger 100 is always located between the first annular portion 271 and the second annular portion 272.

In some examples, as illustrated in FIG. 5, the first support ring 271 can be attached to the first nut 241, and the first nut 241 can apply a force in the first direction X to the first support ring 271; the second support ring 272 can be attached to the high pressure seal assembly 260, so that the force exerted by the first nut 241 is transmitted to the high pressure seal assembly 260, thereby compressing the high pressure seal assembly 260. At this time, lubricating grease entering from the first grease injection hole can also lubricate the high pressure seal assembly 260.

Figure 8:
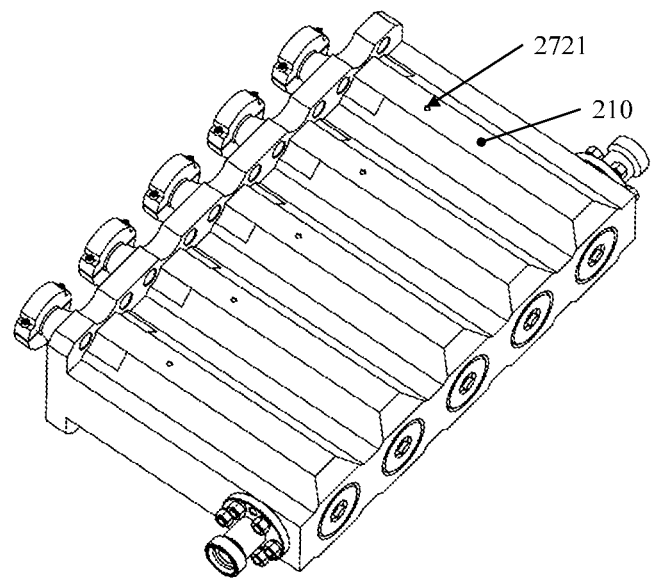
FIG. 8 is a schematic structural diagram of a hydraulic end according to an embodiment of the present disclosure.
Figure 9:
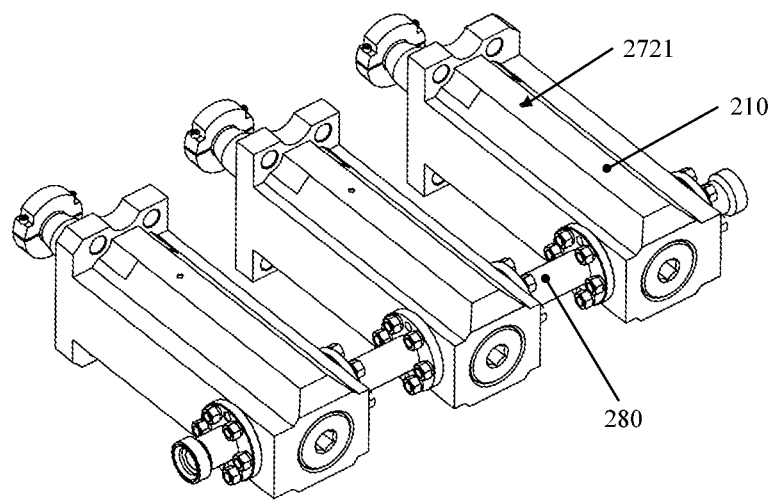
FIG. 9 is a schematic structural diagram of another hydraulic end according to an embodiment of the present disclosure.

FIG. 8 is a schematic structural diagram of a hydraulic end according to an embodiment of the present disclosure; FIG. 9 is a schematic structural diagram of another hydraulic end according to an embodiment of the present disclosure. As illustrated in FIGS. 8 and 9, the valve box is arranged in a plurality, and the plurality of valve boxes 210 are arranged in a second direction perpendicular to the first direction X, so that the displacement of the hydraulic end can be increased.

In some examples, as illustrated in FIG. 8, the plurality of valve boxes 210 are integrally formed; that is, the plurality of valve boxes 210 have an integrated structure. Therefore, the hydraulic end has high strength and strong bearing capacity, which can meet the requirements of high-power continuous operation.

In some examples, as illustrated in FIG. 9, the plurality of valve boxes 210 are independent components, and two adjacent valve boxes 210 are connected by a connection element 280. Therefore, the hydraulic end is light in weight and convenient to install and maintain; and it can also be applied to a plunger pump with a linear motor as a power end.

For example, two adjacent valve boxes 210 are connected by connecting flanges 280. Of course, embodiments of the present disclosure include but are not limited thereto, and two adjacent valve boxes can also be connected by other types of connectors.

Figure 10:
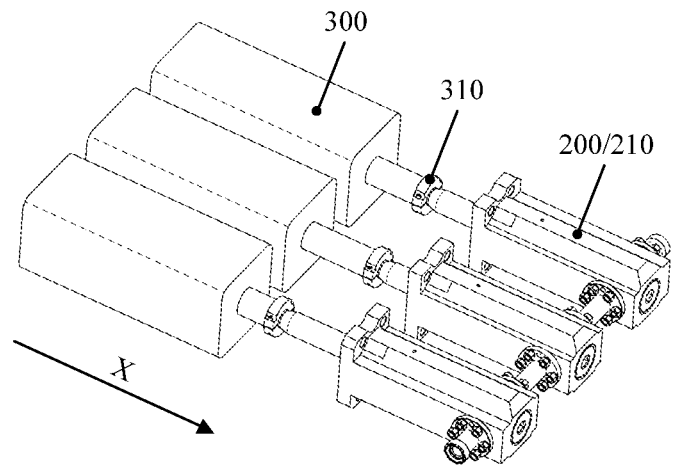
FIG. 10 is a schematic structural diagram of a plunger pump according to an embodiment of the present disclosure.
Figure 11:
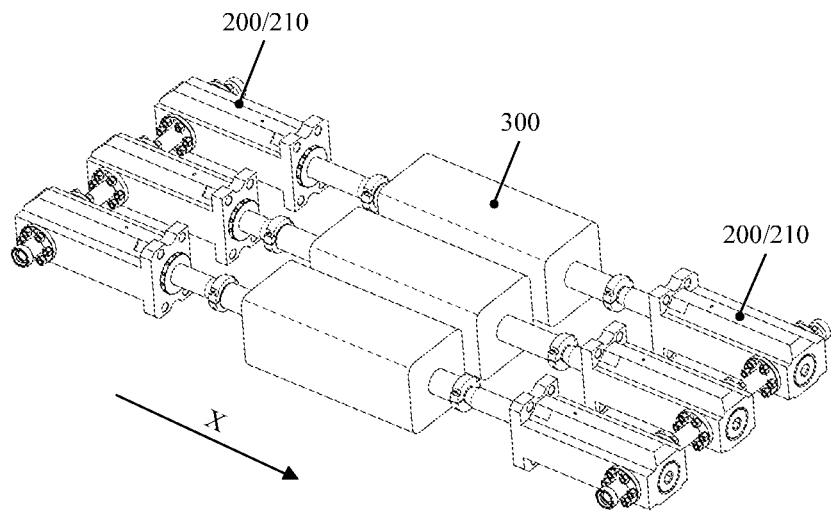
FIG. 11 is a schematic structural diagram of another plunger pump according to an embodiment of the present disclosure.

FIG. 10 is a schematic structural diagram of a plunger pump according to an embodiment of the present disclosure; FIG. 11 is a schematic structural diagram of another plunger pump according to an embodiment of the present disclosure. As illustrated in FIGS. 10 and 11, the plunger pump 400 includes a power end 300 and a hydraulic end 200 provided by any of the above examples. Because the valve box in the hydraulic end will not produce an intersecting line in the alternating chamber, the risk of cracking and water leakage of the valve box can be reduced to improve the durability and service life of the valve box, so the plunger pump has higher durability and service life; in addition, because the replacement frequency of the valve box is reduced, the plunger pump also has lower cost and higher use efficiency.

In some examples, as illustrated in FIG. 10, the plunger pump 400 further includes a clamp 310, the clamp 310 connects the power end 300 with the plunger 100 of the hydraulic end 200, so that the kinetic energy of the power end 300 can be transmitted to the plunger 100 of the hydraulic end 200 and the plunger 100 can reciprocate in the first direction X.

In some examples, as illustrated in FIG. 11, two sides of the power end 300 in the first direction X can be respectively provided with a hydraulic end 200, so that kinetic energy of the plunger of the hydraulic end 200 at a side of the power end 300 when the plunger moves back can be converted into kinetic energy of the plunger of the other hydraulic end when the plunger moves forward, thereby improving operation efficiency and increasing displacement. Of course, the embodiments of the present disclosure include but are not limited thereto, as illustrated in FIG. 10, the power end 300 can be provided with the hydraulic end 200 only at a side in the first direction X.

In some examples, the power end includes a linear motor. For example, the stroke of the linear motor is greater than or equal to 40 inches.

Figure 12:
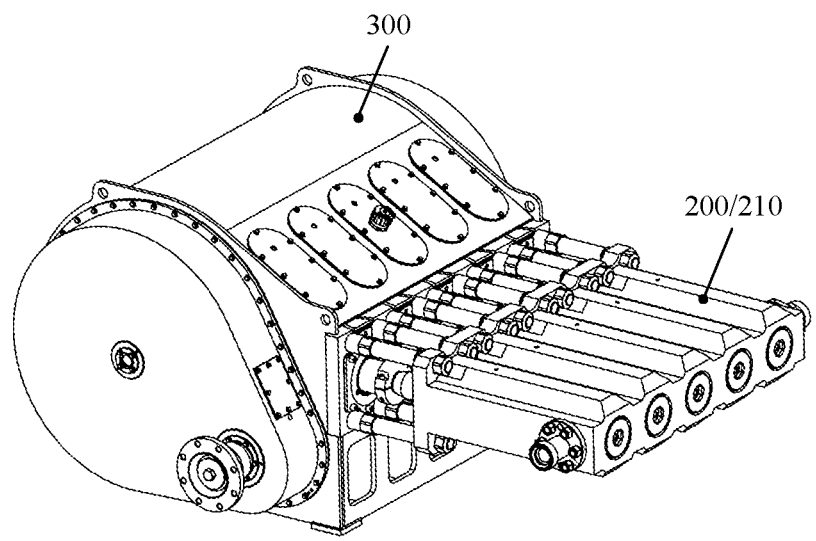
FIG. 12 is a schematic structural diagram of another plunger pump according to an embodiment of the present disclosure.

FIG. 12 is a schematic structural diagram of another plunger pump according to an embodiment of the present disclosure. As illustrated in FIG. 12, the hydraulic end 200 can also adopt a common power end 300, that is, a power end including a crank-connecting rod mechanism.

Figure 13:
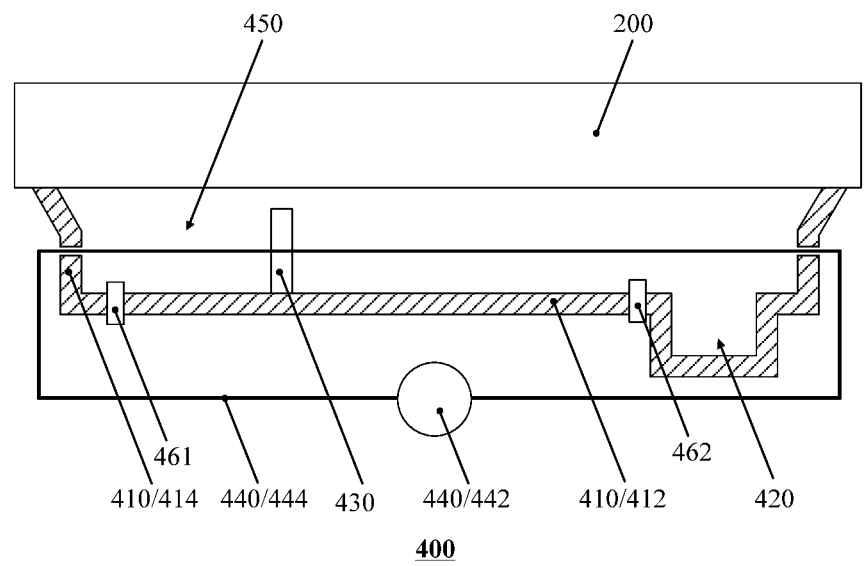
FIG. 13 is a schematic structural diagram of another plunger pump according to an embodiment of the present disclosure.
Figure 14:
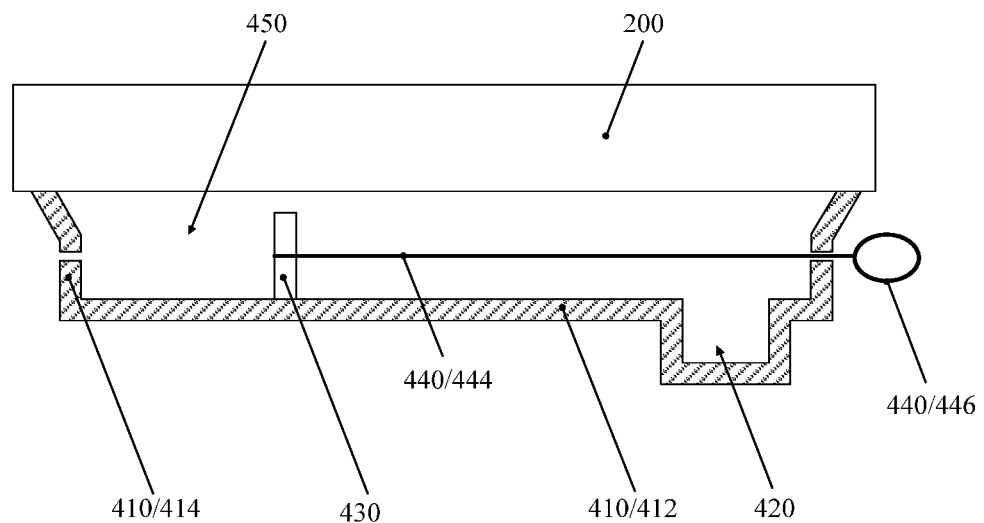
FIG. 14 is a schematic structural diagram of another plunger pump according to an embodiment of the present disclosure.

FIG. 13 is a schematic diagram of another plunger pump according to an embodiment of the present disclosure; FIG. 14 is a schematic diagram of another plunger pump according to an embodiment of the present disclosure. As illustrated in FIG. 13 and FIG. 14, the plunger pump 400 further includes an oil receiving plate 410, an oil receiving box 420, a scraper 430 and a driving assembly 440; the oil receiving plate 410 is located below the hydraulic end 200, and includes a bottom plate 412 and a shell 414 arranged around the bottom plate 412, the bottom plate 412 and the shell 414 together form an oil receiving groove 450, the oil receiving groove 450 is configured to receive liquid dripped from the hydraulic end 200; the oil receiving box 420 is located at the side of the bottom plate 412 away from the hydraulic end 200 and is configured to collect the liquid in the oil receiving groove 450, the scraper 430 is located in the oil receiving groove 450 and is configured to move in the length direction of the bottom plate 412; the driving assembly 440 is configured to drive the scraper 430 to move in the length direction of the bottom plate 412. Therefore, the liquid dripped from the hydraulic end 200 can be received by the oil receiving groove 450, and then the liquid received by the oil receiving groove 450 can be scraped into the oil receiving box 420 by the driving assembly 440. It should be noted that the above-mentioned liquid dripped from the hydraulic end includes lubricating grease and oil.

For example, as illustrated in FIG. 13, the driving assembly 440 includes a motor 442 and a wire rope 444, the wire rope 444 is connected to the scraper 430, and the motor 442 can drive the wire rope 444 to move, thereby driving the scraper 430 to move.

For example, as illustrated in FIG. 13, the plunger pump 400 can further include an oil amount sensor 461 and a position sensor 462; the oil amount sensor 461 can be used to sense the amount of liquid dripped from the hydraulic end 200 and received by the oil receiving groove 450, and the position sensor 462 can be used to sense the position of the scraper 430. Therefore, when the oil amount sensor 461 detects that lubricating grease and oil in the oil receiving groove 450 reach a certain amount, the oil amount sensor 461 can feed back a signal to the control system, and the motor 442 rotates forward (clockwise in FIG. 13) to drive the wire rope 444 to move to collect lubricating grease and oil in the oil receiving box 420; when the scraper 430 moves to the position sensor 462, the position sensor 462 feeds back information to the control system, and the motor 442 reverses (counterclockwise in FIG. 13) to drive the wire rope 444 to move in reverse.

In some examples, as illustrated in FIG. 14, the driving assembly 440 can further include a wire rope 444 and a pull ring 446, so as to realize manual operation.

The following statements need to be explained:

(1) In the drawings of the embodiments of the present disclosure, only the structures related to the embodiments of the present disclosure are involved, and other structures may refer to the common design(s);

(2) In case of no conflict, features in one embodiment or in different embodiments of the present disclosure can be combined.

The above are merely particular embodiments of the present disclosure but are not limitative to the scope of the present disclosure; any of those skilled familiar with the related arts can easily conceive variations and substitutions in the technical scopes disclosed in the present disclosure, which should be encompassed in protection scopes of the present disclosure. Therefore, the scopes of the present disclosure should be defined in the appended claims.

The invention claimed is:

1. A hydraulic end of a plunger pump, comprising:
   a valve box, comprising a third end portion and a fourth end portion,
   wherein the valve box comprises a plunger chamber inside the valve box, the plunger chamber comprises a low pressure chamber, an alternating chamber and a high pressure chamber which are sequentially arranged, the low pressure chamber comprises a second opening at a position where the third end portion is located, the alternating chamber is communicated with the low pressure chamber, the high pressure chamber is communicated with the alternating chamber and located at a side of the alternating chamber away from the low pressure chamber, and the high pressure chamber comprises a third opening at a position where the fourth end portion is located;
   the valve box further comprises a second liquid inlet hole and a liquid outlet hole, the second liquid inlet hole passes through a sidewall of the valve box and is communicated with the low pressure chamber, the liquid outlet hole passes through a sidewall of the valve box and is communicated with the high pressure chamber;
   wherein the low pressure chamber, the alternating chamber and the high pressure chamber are sequentially arranged in a first direction; and
   wherein the hydraulic end further comprising:
   a first nut fixed at the second opening and comprising a second intermediate hole; and
   a plunger extending into the plunger chamber from the second intermediate hole and configured to reciprocate in the first direction,
   wherein the plunger comprises a plunger body, the plunger body comprises a flow channel inside the plunger body; a first liquid inlet hole on the plunger body and passing through a sidewall of the plunger body; and a first valve assembly, the plunger body comprises a first end portion and a second end portion, the flow channel extends from the first end portion to the second end portion, a part of the flow channel close to the first end portion is closed, a part of the flow channel close to the second end portion comprises a first opening, the first liquid inlet hole is communicated with the flow channel, and the first valve assembly is at the first opening, and is configured to allow fluid to flow out from the flow channel at the second end portion and prevent fluid from flowing back to the flow channel from outside, and the first liquid inlet hole is always in the low pressure chamber during the movement of the plunger.

2. The hydraulic end according to claim 1, wherein an average size of the low pressure chamber in a direction perpendicular to the first direction is greater than an average size of the alternating chamber in the direction perpendicular to the first direction, and an average size of the high pressure chamber in the direction perpendicular to the first direction is greater than an average size of the alternating chamber in the direction perpendicular to the first direction.

3. The hydraulic end according to claim 1, wherein the low pressure chamber, the alternating chamber and the high pressure chamber are coaxially arranged.

4. The hydraulic end according to claim 1, further comprising:
a second nut fixed at the third opening; and
a second valve assembly in the high pressure chamber,
wherein the second valve assembly is configured to allow fluid to flow from the alternating chamber into the high pressure chamber and prevent fluid from flowing back from the high pressure chamber to the alternating chamber.

5. The hydraulic end according to claim 4, wherein the second valve assembly comprises:
a second spring seat arranged in contact with and pressed by the second nut and comprising a second spring;
a second valve seat at a part of the high pressure chamber close to the alternating chamber and comprising a third intermediate hole; and
a second valve body,
wherein one end of the second valve body is arranged to contact the second spring seat, and the other end of the second valve body is arranged to contact the second valve seat and inside the third intermediate hole.

6. The hydraulic end according to claim 5, wherein the second valve body comprises a second main body portion, and a third guide rod and a fourth guide rod which are respectively arranged on two sides of the second main body portion,
the second spring seat comprises a second seat fixing portion, a second spring fixing portion and a third guiding portion in the second spring fixing portion, the second seat fixing portion is pressed against the third opening by the second nut, the second spring is sleeved outside the second spring fixing portion;
the second spring is arranged in contact with the second main body portion, and the third guide portion is configured to accommodate at least a part of the third guide rod to guide the third guide rod.

7. The hydraulic end according to claim 6, wherein the second valve assembly further comprises:

a second guide seat at a side of the second valve seat away from the second spring seat; and
a fourth guide portion connected to the second guide seat and configured to accommodate at least a part of the fourth guide rod to guide the fourth guide rod.

8. The hydraulic end according to claim 1, further comprising:
a support ring located in the low pressure chamber and at a side of the first nut close to the alternating chamber,
wherein the support ring comprises a first annular portion and a second annular portion which are relatively arranged at intervals, and a plurality of support strips which are between the first annular portion and the second annular portion, one end of each of the plurality of support strips is fixed with the first annular portion and the other end of the each of the plurality of support strips is fixed with the second annular portion, the plurality of support strips are arranged at intervals to form a plurality of hollow openings,
the first annular portion comprises a fourth intermediate hole, the second annular portion comprises a fifth intermediate hole, the plunger is configured to pass through the fourth intermediate hole and the fifth intermediate hole, and the first nut is configured to press the support ring.

9. The hydraulic end according to claim 8, wherein the support ring further comprises:
a first sealing groove on an outer sidewall of the first annular portion; and
a second sealing groove on an outer sidewall of the second annular portion,
wherein the first sealing groove and the second sealing groove are configured to accommodate a sealing ring.

10. The hydraulic end according to claim 1, wherein the hydraulic end comprises a plurality of valve boxes, and the plurality of valve boxes are arranged in a second direction perpendicular to the first direction.

11. A plunger pump, comprising:
a power end; and
the hydraulic end according to claim 8.

12. The plunger pump according to claim 11, further comprising:
an oil receiving plate located below the hydraulic end and comprising a bottom plate and a shell arranged around the bottom plate, the bottom plate and the shell forming an oil receiving groove together, and the oil receiving groove being configured to receive liquid dripped from the hydraulic end;
an oil receiving box located at a side of the bottom plate away from the hydraulic end and configured to collect liquid in the oil receiving groove;
a scraper located in the oil receiving groove and configured to move in a length direction of the bottom plate; and
a driving assembly configured to drive the scraper to move in the length direction of the bottom plate.

\* \* \* \* \*